July 9, 1935.  W. E. SHARP  2,007,310

METHOD OF MAKING TIGHT FITTING NUTS

Filed Aug. 31, 1932

INVENTOR
William E. Sharp
BY
Towson Price
ATTORNEY

Patented July 9, 1935

2,007,310

UNITED STATES PATENT OFFICE 2,007,310

METHOD OF MAKING TIGHT FITTING NUTS

William E. Sharp, Chicago, Ill.; Minnie E. Sharp, executrix of the estate of said Sharp, deceased Application August 31, 1932, Serial No. 631,250

3 Claims. (Cl. 10—86)

This invention relates to wrench tight fitting nuts and, more particularly, to such which are readily produced from hot forged nut blanks of uneven thickness, and the process of making such nuts.

The principal object of my invention, generally considered, is to provide a process of making wrench tight fitting nuts from hot forged nut blanks of uneven height, whereby such nuts may be produced more cheaply and readily than the usual type of lock nuts.

Another object of my invention is the provision of a method of making wrench tight fitting nuts involving operating on hot forged nut blanks of non-uniform thickness to bring them all to uniform thickness within narrow limits, tapping said blanks to cut threads thereon, and finally subjecting each blank to a blow to reduce the distance between a few threads adjacent one face so that when threaded on a corresponding bolt, these threads will bind with the desired tight fitting action thereon.

A further object of my invention is to manufacture wrench tight fitting nuts of uniform horizontal section and having the appearance of ordinary commercial nuts, said nuts being threaded and having the linear pitch of the threads adjacent one face thereof slightly smaller than normal, so that they will bind on the threads of a corresponding bolt.

Other objects and advantages of the invention relating to the particular arrangement and construction of the various parts will become apparent as the description proceeds.

Referring to the drawing illustrating my invention, the scope whereof is defined by the appended claims:—

Figure 1:
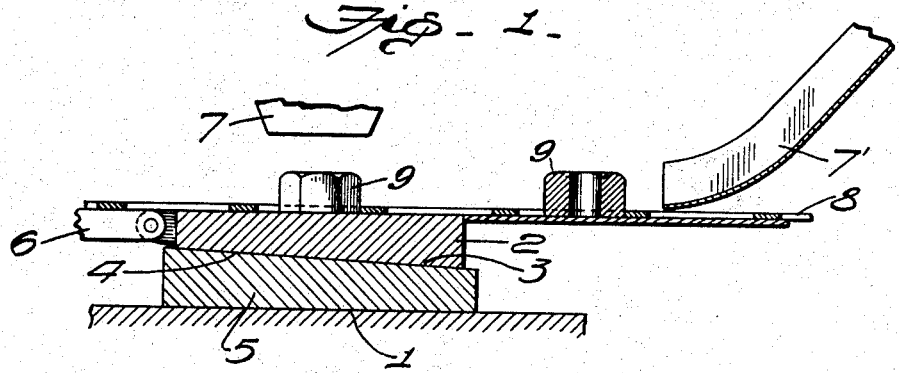
Figure 1 is a fragmentary view showing a portion of a machine for acting on nut blanks to bring them all to the desired uniform thickness.

As is well known, the hot forged run of nut blanks involves a variation in the height of the blank or distance between the upper and lower faces thereof. If such blanks, after threading, were treated in a machine to produce a desired tight fitting action on the threads thereof, there would be a variation in such action if the nuts were treated uniformly in such a machine in accordance with the variation in the height thereof. It is my purpose, therefore, to pre-treat such nut blanks before threading, so that the desired uniform tight fitting effect may be produced by a desired uniform treatment.

Now referring to the drawing in detail, like parts being designated by like reference characters, there is shown a machine 1 involving an anvil 2 adjustable in any desired manner as by means of having its lower face 3 inclined and engaging a complementary incline 4 on a base 5, and adapted for adjusting movement by means of a connected link 6 and a cooperating hammer or pressure member 7. The machine is adapted to receive nuts one at a time, or in a uniform manner, as from a chute 1' and belt 8 which carries the nuts at the desired rate of speed over the anvil to and beneath the hammer 7, whereby, as the machine operates, each nut blank 9, representing one of a batch of blanks of irregular or uneven thickness, has its height reduced to a uniform thickness to a degree not varying .005".

Figure 2:
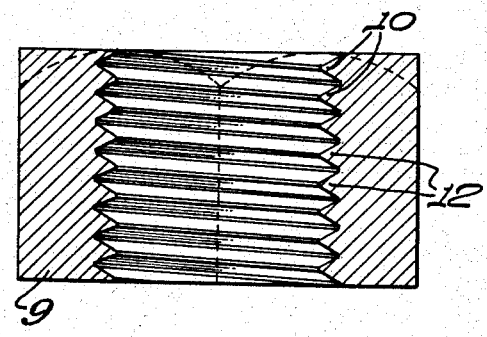
Figure 2 is a vertical sectional view of the nut after being brought to a desired height, as by the machine shown in Figure 1, and threaded.

After the nut blanks have been processed, as just described, to render them of uniform thickness within the degree of accuracy specified, they are tapped or machined to cut threads of the desired form thereon, as represented in Figure 2. This thread-cutting operation may be performed in any desired manner, as by means of commercial automatic machinery.

Figure 3:
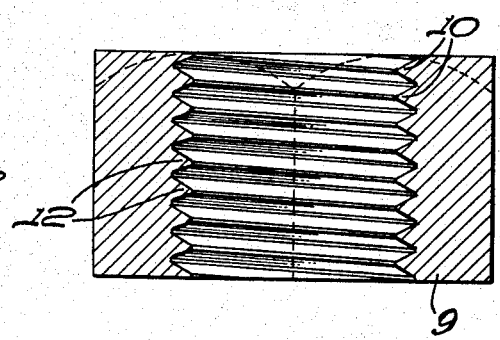
Figure 3 is a corresponding view of a nut such as shown in Figure 2 after being further treated to reduce the linear pitch of a few threads adjacent the upper face thereof.

After the nut blanks have been threaded, they are subjected to a pressure or hammer blow to reduce the distance between the threads in the top portion of the nut, and produce a nut slightly decreased in height, as represented in Figure 3, so that when they are turned upon a bolt, such top threads will bind to the desired degree on the bolt threads with a gripping action. The production of the gripping action on the threads may be effected in any desired manner, as by means of a machine similar to that which initially acts on the blanks to form them of uniform height within the desired degree of accuracy.

Figure 4:
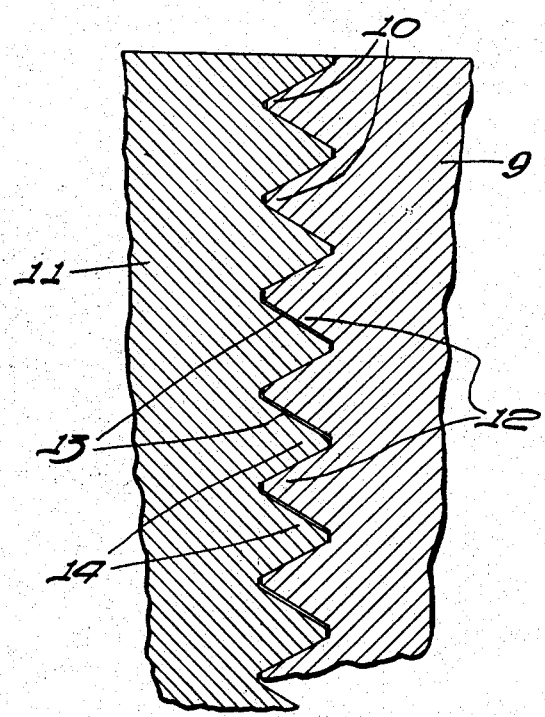
Figure 4 is an enlarged fragmentary sectional view showing a nut embodying my invention applied to an associated bolt.

By virtue of the before-described processing of nut blanks, I provide nuts which have the general appearance of ordinary nuts, and may be manufactured much cheaper than the previous forms of lock nuts, in that the blanks employed are ordinary nut blanks rather than specially formed blanks. The gripping action provided is limited to the top threads 10 in the nuts 9 rather than being distributed to the entire series of threads, because it has been proven that in subjecting such nuts to pressure, as heretofore described, the metal will flow or crush near the surface without any material change in the threads on the portion of the nut away from the surface. This action is illustrated in Figure 4, in which it is shown that the outermost threads 10 are crowded together with the taking up of all lead clearance with respect to the associated bolt 11, while the threads 12 away from the surface of the nut are unchanged and have the usual clearance 13 with respect to the threads 14 on the bolt 11.

Although a preferred embodiment of my invention has been disclosed, it will be understood that modifications may be made within the spirit and scope of the appended claims.

I claim:—

1. The method of making wrench tight fitting nuts comprising operating on commercial nut blanks of uneven thickness to bring them all to uniform thickness, machining said blanks to cut threads thereon, and finally subjecting each of them to a blow to reduce the distance between the threads in the top portions thereof to a desired extent.

2. The method of making nuts adapted to bind on an associated bolt comprising passing commercial nut blanks of non-uniform thickness through a machine to bring them all to uniform thickness, tapping said nut blanks to cut threads thereon, and finally subjecting each to a blow to crowd threads adjacent one surface thereof to a desired extent.

3. The method of making nuts adapted to fit tight on an associated bolt comprising processing commercial nut blanks before threading so as to make all of said blanks of the same thickness within a degree of accuracy not varying .005 inch, threading said blanks, and again subjecting them to pressure so as to reduce the distance between the points of threads adjacent one face thereof.

WILLIAM E. SHARP.